United States Patent [19]

Otsuka et al.

[11] Patent Number: 5,489,327

[45] Date of Patent: Feb. 6, 1996

[54] PROCESS FOR PURIFYING HYDROGEN GAS

[75] Inventors: Kenji Otsuka; Noboru Takemasa, both of Hiratsuka, Japan

[73] Assignee: Japan Pionics Co., Ltd., Tokyo, Japan

[21] Appl. No.: 373,032

[22] Filed: Jan. 17, 1995

[30] Foreign Application Priority Data

Mar. 4, 1994 [JP] Japan ................... 6-058353

[51] Int. Cl.$^6$ ................... B01D 53/04
[52] U.S. Cl. ................... 95/116; 95/117; 95/130; 95/138; 95/139; 95/140; 95/143
[58] Field of Search ................... 95/114, 116, 117, 95/130, 138–140, 143, 147

[56] References Cited

U.S. PATENT DOCUMENTS

| | | | |
|---|---|---|---|
| 3,101,261 | 8/1963 | Skarstrom | 95/143 X |
| 3,141,748 | 7/1964 | Hoke et al. | 95/143 X |
| 3,467,493 | 9/1969 | Eguchi et al. | 95/138 X |
| 4,183,369 | 1/1980 | Thomas | 95/139 X |
| 4,312,669 | 1/1982 | Boffito etal. | 95/138 X |
| 4,432,774 | 2/1984 | Jüntgen et al. | 95/138 X |
| 4,717,551 | 1/1988 | Bernauer et al. | 95/130 X |
| 4,976,938 | 12/1990 | Knize et al. | 95/116 X |

FOREIGN PATENT DOCUMENTS

| | | | |
|---|---|---|---|
| 0240252 | 10/1987 | European Pat. Off. | |
| 0402498 | 12/1990 | European Pat. Off. | |
| 0422559 | 4/1991 | European Pat. Off. | 95/116 |
| 0475312 | 3/1992 | European Pat. Off. | 95/117 |
| 2161347 | 7/1973 | France | 95/130 |
| 2557810 | 7/1985 | France | 95/143 |
| 53-006639 | 3/1978 | Japan | 95/143 |
| 4-160010 | 6/1992 | Japan | 95/130 |
| 0762939 | 9/1980 | U.S.S.R. | 95/130 |
| 0961925 | 6/1964 | United Kingdom | 95/143 |
| 2177079 | 1/1987 | United Kingdom | 95/143 |
| 2188620 | 10/1987 | United Kingdom | 95/138 |
| 2234451 | 2/1991 | United Kingdom | 95/130 |

OTHER PUBLICATIONS

"Removal Of Nitrogen And Methane From Hydrogen By Metal Getters", H. Heimbach et al, Fusion Technology (Commission Eur. Communities—Eur 9183), vol. 1, 1984, pp. 421–426.

Primary Examiner—Robert Spitzer
Attorney, Agent, or Firm—Frishauf, Holtz, Goodman, Langer & Chick

[57] ABSTRACT

There is diclosed a process for purifying hydrogen gas which comprises removing impurities such as nitrogen, oxygen, methane, carbon monoxide, carbon dioxide and moisture contained in a crude hydrogen gas by bringing the crude hydrogen gas into contact under heating with a hydride of a zirconium alloy such as Zr-V, Zr-V-Ni, Zr-V-Cr, Zr-V-Co, Zr-V-Fe, Zr-V-Cu, Zr-V-Ni-Cr, Zr-V-Ni-Co and Zr-V-Cr-Fe. By virtue of using the above Zr alloy hydride, the process enables highly advanced purification of crude hydrogen gas by removing such impurities as above to a level as low as 1 ppb or less in high safety and efficiency at low installation and running costs.

11 Claims, 1 Drawing Sheet

PROCESS FOR PURIFYING HYDROGEN GAS

BACK OF THE INVENTION

1. Field of the Invention

The present invention relates to a process for purifing hydrogen gas. More particularly, it pertains to a process for purifying hydrogen gas through removing the impurities contained in unpurified hydrogen gas by bringing the unpurified hydrogen gas into contact under heating with a specific purifying material.

2. Description of the Related Arts

With the remarkable development of semiconductor industries in recent years, hydrogen gas has been used very often and abundantly in the above industries as an atmosphere gas etc. during a variety of processes. In addition, with enhanced degree of integration of semiconductors, the requirement for higher purity of hydrogen gas becomes increasingly strong.

Under such a circumstance it is desired to highly purify hydrogen gas by efficiently removing such impurities as nitrogen ($N_2$), a hydrocarbon(HC), carbon monoxide(CO), carbon dioxide($CO_2$), oxygen($O_2$) and moisture that are contained in unpurified hydrogen gas in an order of ppm, to a level as low as an order of ppb or lower.

Already known process for purifying hydrogen gas is exemplified by a (A) purifying process utilizing a palladium alloy membrane having selective permeability to hydrogen under heating, a (B) adsorption purifying process at room temperature by the combined use of a chemical reaction by a metallic catalyst such as nickel and a physical adsorptivity of an adsorbent such as synthetic zeolite and a (C) purifying process by cryogenic adsorption utilizing a physical adsorptivity of an adsorbent provided under a cryogenic condition by the use of liquefied nitrogen as a cryogen.

However, the above-mentioned (A) purifying process utilizing a palladium alloy membrane suffers a disadvantage of higher installation cost per unit output of the purified gas in spite of its advantage that the utilization of selective permeability imparted to hydrogen gas enables the production of hydrogen gas in ultrahigh purity by almost perfectly removing the impurities contained in the unpurified hydrogen gas.

The aforementioned (B) adsorption purifying process suffers a drawback of its being incapable of removing hydrocarbons and nitrogen that are contained in relatively large amounts in the unpurified hydrogen gas despite its advantage of lower installation cost per unit output of the purified gas.

On the other hand, the above-mentioned (C) process by cryogenic adsorption is capable of removing almost all the impurities including hydrocarbons and nitrogen and locates its installation cost between that for the process (A) and that for the process (B). However, one of the shortcomings of the process (C) is a high running cost due to the use of expensive liquefied nitrogen.

With regard to the purification of a rare gas such as argon and helium, there is known that a process for purifying the rare gases by the use of an alloy getter such as a zirconium-based alloy and a titanium-based alloy is capable of purifying the rare gases to a high purity and relatively low in its installation cost. Nevertheless, the aforesaid purifying process, when applied to the purification of hydrogen gas, causes remarkable generation of heat resulting from the violent reaction between the hydrogen gas and the alloy getter, thereby rendering itself inapplicable to the purification of hydrogen gas.

As described hereinbefore, there has heretofore been unavailable a hydrogen gas purification process capable of simultaneously meeting the requirements for lower installation and running costs per unit output of the purified gas as well as for safe production of hydrogen gas with higher purity. Thus, the development of such process has strongly and keenly been desired.

SUMMARY OF THE INVENTION

Under such circumstances, intensive research and investigation were continued by the present inventors in order to develop a process and equipment for efficiently and safely producing highly pure hydrogen gas at minimized installation and running costs. As a result, it has been found that the use of a zirconium alloy hydride can safely and efficiently remove the impurities in unpurified hydrogen gas at a relatively lower temperature without causing a fear of danger such as heat generation. The present invention has been accomplished on the basis of the above-mentioned finding followed by further research continued.

Specifically, the present invention provides a process for purifying hydrogen gas which comprises removing impurities contained in a crude hydrogen gas by bringing said crude hydrogen gas into contact under heating with a zirconium alloy hydride.

Figure 1:
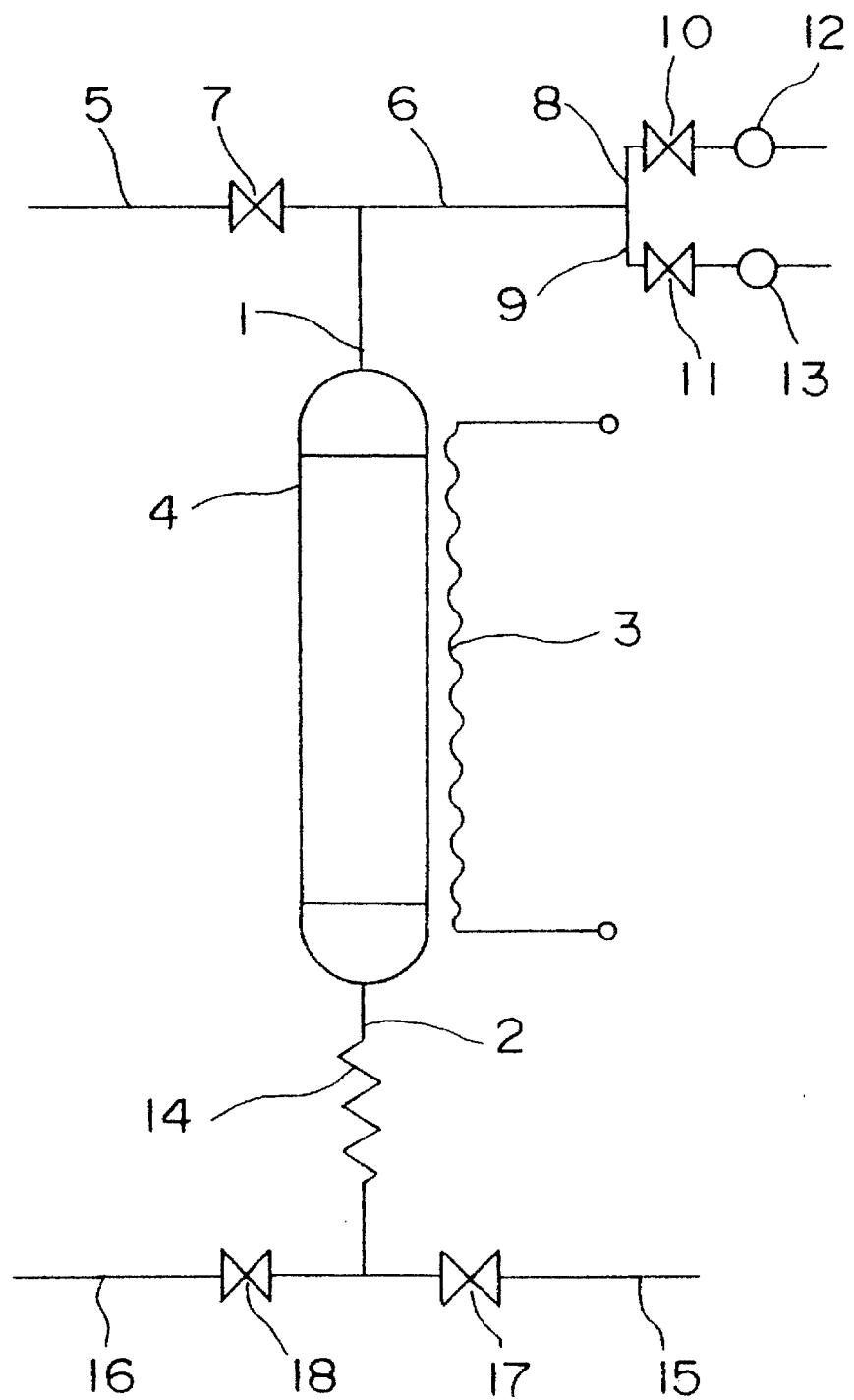
FIG. 1 is an example of schematic block flow diagram illustrating the equipment for purifying hydrogen gas to be used for the process according to the present invention.

Legend: 1; inlet pipe, 2; outlet pipe, 3; heater, 4; purifying column, 5; feed piping for crude hydrogen gas, 6; introducing piping for hydrogen-dilution gas, 8; introducing piping for hydrogen gas, 9; introducing piping for rare gas, 7, 10, 11, 17 and 18; valves, 12 and 13; flowmeter, 14; cooler, 15; exhaust piping, 16; takeout piping for purified hydrogen gas

DESCRIPTION OF PREFERRED EMBODIMENTS

As a preferred embodiment to carry out the process according to the present invention, mention is made of a process which comprises the steps of feeding an unpurified hydrogen gas(crude hydrogen gas) to a purifying column packed inside with a zirconium alloy hydride and bringing the crude hydrogen gas into contact under heating with the zirconium alloy hydride to remove impurities contained in the crude hydrogen gas.

The process according to the present invention is applied to the crude hydrogen gas containing such impurities as nitrogen($N_2$),oxygen($O_2$), carbon monoxide(CO), carbon dioxide($CO_2$) and methane($CH_4$), especially $N_2$ and $CH_4$ in relatively large amounts.

In the process according to the present invention a zirconium alloy hydride is employed. A variety of zirconium alloys are available to constitute their hydrides and exemplified by a binary or multicomponent alloy composed of (1) zirconium(Zr) and at least one metallic element selected from the group consisting of (2) vanadium(V), titanium(Ti), niobium(Nb), chromium(Cr), nickel(ni), iron(Fe), copper(Cu), cobalt(Co) and tungsten(W), more specifically by Zr-V, Zr-Ti, Zr-Fe, Zr-Cu, Zr-Cr, Zr-Ni, Zr-Co, Zr-Nb, Zr-W as binary alloys and Zr-V-Ni, Zr-V-Cu, Zr-V-Co, Zr-V-Fe, Zr-V-Ni-Cu, Zr-V-Ni-Cr, Zr-V-Ni-Co and Zr-V-Cr-Fe as multicomponent alloys. Of these alloys is usually favorable a vanadium-containing zirconium alloy from the viewpoint of its capability of efficiently removing the impurities in a relatively low temperature region such as 600° C. or lower, which impurities include nitrogen necessitating a high temperature for its removal and methane increased in its amount by an excessively high temperature as opposed to nitrogen. Examples of such zirconium alloy include Zr-V, Zr-V-Ni, Zr-V-Cr, Zr-V-Co, Zr-V-Fe, Zr-V-Cu, Zr-V-Ni-Cr, Zr-V-Ni-Co and Zr-V-Cr-Fe. Of these Zr-V alloys are particularly preferable a Zr-V binary alloy for its remarkable superiority in removal capability and a multicomponent alloy consisting essentially of Zr, V and at least one metallic element selected from Ni, Cr and Co because of its superiority in pulverizability and processability as well as its moderate removal capability.

The compositional ratio of Zr to a metallic element other than Zr in such an alloy is properly determined according to the kinds of elements without specific limitation. In the case of the above-mentioned Zr-V binary alloy, the content of vanadium(V) is usually 5 to 50%, preferably 15 to 40% by weight with the balance being Zr.

In the case of a multicomponent alloy containing Zr and V, the content of V is usually 5 to 50%, preferably 15 to 40% by weight and the total content of at least one element selected from Ni, Cr and Co is usually 0.5 to 30%, preferably 2 to 10% by weight with the balance being Zr.

An unreasonably low proportion of V will cause a fear of deteriorating the removal capability of the impurities, especially nitrogen, while an unreasonably low proportion of Zr will result in a fear of deteriorating the removal capacity of the impurities. An unreasonably low proportion of Ni, Cr, Co or the like in the case of a multicomponent alloy will bring about a fear of failure to exert the effect on improving the pulverization processing of the alloy, whereas an excessively high proportion thereof will give rise to adverse effect on the removal capability.

The above-mentioned zirconium alloy can be produced by compounding the aforesaid respective metallic components in prescribed proportions, followed by electron beam melting in a water cooling-type copper hearth, argon arc melting, or high frequency heating melting or resistance heating melting in an atmosphere of vacuum or reduced pressure with an inert gas such as argon in a crucible made of magnesia or alumina. The alloy thus obtained is crushed to a size of 6 to 20 mesh, approximately through mechanical crushing by the use of a ball mill, jaw crusher, roll mill or the like for practical use, or pulverized to a size of about 100 mesh, followed by molding into the form of pellet for actual application.

The above-described zirconium alloy hydride to be used in the process according to the present invention can be produced by an (aa) method in which hydrogen gas which has been diluted with a rare gas is allowed to flow through a vessel previously packed inside with a zirconium alloy at a flow rate of such an extent as not causing sudden generation of heat to bring about a reaction with the zirconium alloy into a hydride thereof or a (bb) method in which hydrogen gas is fed in a closed vessel under reduced pressure which is packed inside with a zirconium alloy at a flow rate of such an extent as not causing sudden generation of heat to form a hydride in an atmosphere of hydrogen gas under reduced pressure. Of the aforesaid two methods, the former method (aa) is preferable in view of its facilitated controllability for heat generation due to the reaction.

Example of the usable rare gases for diluting hydrogen gas include argon, helium, neon, xenon and krypton, among which is usually employed argon or helium. The concentration of the hydrogen gas in the rare gas is not specifically limited but is within the range of usually 1 to 40%, preferably 3 to 20% by volume taking into consideration the requirement for a high flow rate of mixed gas in the case of a low concentration of the hydrogen gas, and also a lowered dilution effect by a dilution gas in the case of a high concentration thereof. In the case where the hydrogenation is put into practice in an atmosphere of hydrogen gas under reduced pressure, the hydrogen gas need only be fed at a flow rate of such an extent as not causing sudden generation of heat.

The hydrogenation reaction proceeds, being accompanied by heat generation, as a hydrogen gas usually at room temperature is fed in a vessel packed inside with any of the zirconium alloys. The reaction is continued until the zirconium alloy almost ceases adsorbing hydrogen gas.

The temperature at the time of exothermic hydrogenation reaction can be regulated by the concentration and the feed rate of the hydrogen gas to be fed to the Zr alloy and the like and it is regulated to a temperature usually in the range of 100° to 800° C. An unreasonably low concentration thereof will require an unreasonably long reaction time, whereas an excessively high concentration thereof will bring about difficulty in temperature regulation owing to violent heat generation.

It is preferable that the zirconium alloy hydride thus obtained be subjected to an activation treatment at an elevated temperature prior to its use for the purification of crude hydrogen gas. In view of such a treatment, it is preferable that at least the latter half of the hydrogenation reaction be carried out at a temperature of 600° to 700° C. to simultaneously effect activation treatment.

It may be all right to carry out the hydrogenation of the Zr alloy in a vessel other than a purifying column for crude hydrogen gas, and after the completion of the hydrogenation, charge the column with the resultant hydride or to carry out the hydrogenation in the purifying column packed inside with the Zr alloy to be hydrogenated. It is usually preferable, however, to conduct the hydrogenation in the purifying column from the beginning to the end, since such a procedure can dispense with repacking of the hydride and prevent the hydride from being contaminated by the contact with outside air.

With regard to the material of construction for the purifying column packed inside with the Zr alloy hydride, there is employed a quartz glass or one of various metals, preferably a metallic material such as a stainless steel excellent in strength.

Nevertheless, the use of such a metallic material will give rise to a fear that the carbon contained inside the material reacts with hot hydrogen gas to form methane depending on the purification conditions, whereby the resultant methane as an impurity is mixed in the purified gas. In view of the foregoing, it is preferable to employ a metallic material minimized in a carbon content such as stainless steel type: SUS 316 L, SUS 304 L, SUS 321, SUS 347, zircaloy or the like as a construction material for the purifying column.

As described hereinbefore, the crude hydrogen gas is brought into contact under heating with the Zr alloy hydride. The heating temperature at the time of contact is usually 400° to 600° C., preferably 450° to 580° C. An excessively high temperature sometimes results in failure to sufficiently remove methane in the impurities, whereas a temperature lower than 400° C. leads to a fear of deteriorating the removal capability of the impurities, particularly nitrogen.

In the process according to the present invention, it is possible to efficiently remove the impurities including nitrogen, oxygen, carbon monoxide, carbon dioxide, a hydrocarbon containing methane as a principal component, moisture and the like by bringing the crude hydrogen gas into contact with the Zr alloy hydride. In the case where the crude hydrogen gas contains relatively large amounts of impurities such as oxygen, carbon monoxide, carbon dioxide, moisture, etc., it is preferable that, prior to the purification by means of the hydride, the crude hydrogen gas be subjected to a pretreatment through adsorption purifying method at room temperature by the use of a nickel catalyst, copper catalyst, an adsorbent such as synthetic zeolite, Activated carbon, molecular sieving carbon, silica gel, etc., in particular, a nickel catalyst or synthetic zeolite or the combination of both. Since such a pretreatment can preliminarily remove oxygen, carbon monoxide, carbon dioxide, moisture and the like, the Zr alloy hydride is mitigated in its adsorption load, thus enabling itself to efficiently remove the impurities such as nitrogen and a hydrocarbon containing methane as a principal component for a further longer period of time.

In the following, the present invention will be described more specifically with reference to the drawing.

FIG. 1 is an example of schematic block flow diagram illustrating the equipment for purifying hydrogen gas to be used for the process according to the present invention.

According to FIG. 1 a Zr alloy is charged into a purifying column equipped with the gas inlet pipe 1 and the gas outlet pipe 2 each being connected to the column and the heater 3 outside thereof. The inlet pipe 1 is connected to the feed piping for crude hydrogen gas 5 and the introducing pipe for hydrogen-dilution gas 6. The feed piping 5 is equipped with the valve 7 on the way thereof. The introducing piping 6 is branched off into the introducing piping for hydrogen gas 8 and introducing piping for rare gas 9, each of the piping 8,9 being provided with a valve 10, a valve 11 and flowmeters 12, 13. The outlet pipe 2 is connected to the cooler 14, the outlet piping of which is connected to the exhaust piping for exhaust gas during hydrogenation 15 and to the takeout piping for purified hydrogen gas 16. The exhaust piping 15 and takeout piping 16 are provided with the valve 17 and the valve 18, respectively each on the way.

The Zr alloy hydride is produced, for example in the following manner. The valve 17 of the exhaust piping 15 is opened and then the valves 10, 11 are operated to introduce a mixed gas of hydrogen and a rare gas compounded to a prescribed proportion into the column 4, while watching is made to the flowmeter 12 of the introducing piping 8 and the flowmeter 13 of the introducing piping 9. In the column 4, the hydrogen gas diluted with the rare gas comes in contact with the Zr alloy to mildly proceed with the hydrogenation of the alloy. In the course of the hydrogenation, the mixed gas decreased in its total amount by the consumption of hydrogen is exhausted outside the hydrogenation system through the cooler 14 and the exhaust piping 15. The time of completion of hydrogenation can be judged by the elapse of a prescribed time, the point of time at which heat generation is ceased, the point of time at which the difference in the quantity between the introduced gas and the exhaust gas is made negligibly slight, or the like. Upon the completion of the hydrogenation, the valve 10 of the introducing pipe 8 and the valve 11 of the introducing piping 9 are closed. Subsequently, the valve 7 of the feed piping 5 is opened to introduce the crude hydrogen gas in the column 4 and discharge the remaining gas through exhaust piping 15, and thereby the rare gas remaining inside the system is completely expelled to the outside of the system. Upon the completion of such purging the valve 17 is closed to prepare for the start of hydrogen gas purification.

Purification of hydrogen gas is carried out in the following manner. First of all, electric power is applied to the heater 3 to raise the temperature of the purifying column 4 to a prescribed level. Then, by opening the valve 7 of the feed piping 5 and the valve 18 of the takeout piping 16, crude hydrogen gas is fed to the purifying column 4, where the gas is brought into contact with the Zr alloy hydride and thereby the impurities that are contained in the gas is captured by the Zr alloy hydride and removed from the gas. The gas free from the impurities, that is, purified gas with high purity is taken out from the system through the cooler 14 and the takeout piping 16.

According to the present invention, it is made possible to highly purify a crude hydrogen gas by removing the impurities contained therein such as nitrogen, methane, oxygen, carbon monoxide, carbon dioxide, moisture and the like to a level as low as 1 ppb or lower in high safety and efficiency at a relatively low temperature without a fear of heat generation and further at a low cost by virtue of the use of the zirconium alloy hydride specially prepared for the purification of hydrogen gas.

In the following, the present invention will be described in more detail with reference to non-limitative examples.

Example 1

A blend was prepared by mixing 70% by weight of Zr and 30% by weight of V and melted in a magnesia crucible in an atmosphere of argon under reduced pressure by the use of a high frequency induction heating furnace to prepare an ingot alloy, which was then crushed with a jaw crusher and a disc attrition mill each sealed with argon gas to a size to 14 to 100 mesh. Subsequently, the resultant crushed Zr-V alloy in an amount of 600 g was charged in a purifying column with the structure same as that in FIG. 1 made of SUS 316 L having 23 mm inside diameter, and 800 mm length in a packing length of about 400 mm.

Thereafter, the hydrogenation of the packed alloy was carried out by passing argon gas containing 17.8% by volume of hydrogen through the purifying column at a flow rate of 6.6 liter (L) per minute from the beginning of heat generation due to the hydrogenation of the alloy to the end thereof to prepare Zr-V alloy hydride over a period of 4 hours reaction time, while the temperature inside the column was raised from room temperature to 650° C.

Then, a crude hydrogen gas which was incorporated with impurities adjusted to a prescribed concentration by using a mass flow controller was continuously fed in the purifying column at a pressure of 4 kg/cm$^2$G and a flow rate of 4.40 normal liter (NL) per minute, while the column temperature was regulated to 500° C. by heating with a heater.

Since it was impossible to analyze the crude hydrogen gas which was fed in the column with a highly sensitive atmospheric ionization mass spectrometer because of excessively high concentration of the impurities, each of the impurities was analyzed by using the instrument shown below.

Nitrogen and Oxygen: Gas chromatograph with thermal conductivity type detector

Methane: Gas chromatograph with hydrogen flame ionization detector

Carbon monoxide and Carbon dioxide: Gas chromatograph with hydrogen flame ionization detector (after conversion to methane)

Moisture: Capacitance dew-point meter

On the other hand, nitrogen, methane, carbon monoxide, carbon dioxide and moisture in the purified hydrogen gas were analyzed by using an atmospheric ionization mass spectrometer having 0.1 ppb measurable limit (produced by Hitachi Tokyo Electron Co., Ltd). The oxygen in the purified hydrogen gas which could not be analyzed by the aforesaid spectrometer was analyzed with a Harsche trace oxygen analyzer having 2 ppb measurable limit (produced by Osaka Sanso Kogyo. Ltd.).

Tables 1,2,3 and 4 give the compositions of alloys used for preparing hydrides with purification conditions; concentrations of impurities in crude hydrogen gas; concentration of impurities in purified hydrogen gas; and designation of the first break-through component with its break-through time, respectively.

Examples 2 to 7

The procedure in Example 1 was repeated to purify the crude hydrogen gas except that alteration was made to the composition of the Zr-V alloy, or a ternary or quaternary alloy each incorporated with Cr, Ni and/or Co was used. The results are given in Tables 1 to 4.

Examples 8 to 10

The purifying column was combined with pretreatment equipment, that is, adsorption purifying equipment at room temperature in the form of an adsorption column made of SUS 316 L, having 43 mm inside diameter and 628 mm length and packed in the upper zone thereof with a nickel catalyst (produced by Nikki Chemical Co., Ltd., grade N-112) in an amount of 591 g in a packing length of about 354 mm also in the lower zone thereof with 199 g of a molecular sieve 5A in a packing length of about 180 mm. In order to impart full purifying capabilities to the nickel catalyst and the molecular sieve, they had been subjected in advance to activation treatment by allowing hydrogen gas to pass through them for 3 hours at 250° C. for the nickel catalyst and at 350° C. for the molecular sieve, that is, under heated conditions. Thereafter, the procedure in Example 1 was repeated to prepare each alloy hydride except that a ternary or quaternary alloy each incorporated with Cr and/or Co was used, except for Example 8. Subsequently, the procedure in Example 1 was repeated to purify the crude hydrogen gas except that the concentration of each of nitrogen, methane, carbon monoxide and carbon dioxide in the crude hydrogen gas to be fed to the purifying equipment was adjusted to a higher level than that of each of Examples 1 to 7. The compositions of the alloys with purification conditions, concentration of impurities in crude hydrogen gas, concentrations of impurities in purified hydrogen gas and the details of break through are given in Tables 1, 2, 3 and 4, respectively.

Comparative Example 1

The procedure in Example was repeated to purify the crude hydrogen gas except that a hydride of Zr alone was used in place of the Zr-V alloy hydride. The analysis of the impurities in the purified hydrogen gas was carried out by the method same as the method of analyzing the impurities in the crude hydrogen gas, since the use of the highly sensitive mass spectrometer was impossible because of excessively high concentrations of the impurities in the purified hydrogen gas. The results are given in Tables 1 to 4. As can be seen from Table 4, both nitrogen and methane were detected immediately after the beginning of the purification (break-through time of 0). Since the concentration of methane in the purified gas was higher than that in the crude gas, it was recognized that additional methane was formed by the reaction of hydrogen with carbon monoxide, carbon dioxide, etc.

Comparative Example 2

The binary alloy consisting of 70% by weight of Zr and 30% by weight of V same as in Example 1 was charged in the purifying column. An attempt was made to purify the crude hydrogen gas by feeding the gas to the purifying column under the same conditions as in Example 1 but without performing hydrogenation. As a result, the reaction temperature suddenly rose, exceeding 900° C. after about 8 minutes, followed by further rise of the temperature. Thus, because of the dangerous situation, the purification was discontinued.

TABLE 1

| Alloy Composition and Purification Conditions | | |
|---|---|---|
| | Alloy Composition before Hydrogenation wt % | Pretreatment |
| Example 1 | Zr V<br>70 30 | No |
| Example 2 | Zr V<br>50 50 | No |
| Example 3 | Zr V<br>90 10 | No |
| Example 4 | Zr V Cr<br>75 20 5 | No |
| Example 5 | Zr V Ni<br>75 20 5 | No |
| Example 6 | Zr V Co<br>75 20 5 | No |
| Example 7 | Zr V Co Cr<br>75 20 2 3 | No |
| Example 8 | Zr V<br>70 30 | Yes |
| Example 9 | Zr V Cr<br>75 20 5 | Yes |
| Example 10 | Zr V Co Cr<br>75 20 2 3 | Yes |
| Comp. Example 1 | Zr<br>100 | No |
| Comp. Example 2 | Zr V<br>70 30 | No |

TABLE 2

| Concentrations of Impurities in Crude Hydrogen Gas (ppb) | | | | | | |
|---|---|---|---|---|---|---|
| | Nitrogen | Oxygen | Methane | Carbon monoxide | Carbon dioxide | Moisture |
| Example 1 | 2600 | 10200 | 490 | 470 | 500 | 49600 |
| Example 2 | 2500 | 9800 | 520 | 480 | 510 | 49600 |
| Example 3 | 2200 | 10400 | 490 | 530 | 500 | 38800 |
| Example 4 | 2700 | 9600 | 470 | 510 | 490 | 49600 |
| Example 5 | 2300 | 9900 | 510 | 470 | 510 | 63100 |
| Example 6 | 2400 | 10100 | 490 | 500 | 480 | 49600 |
| Example 7 | 2600 | 11000 | 500 | 520 | 470 | 38800 |
| Example 8 | 52100 | 10200 | 9800 | 10200 | 9970 | 49600 |
| Example 9 | 51000 | 9900 | 10300 | 11500 | 10300 | 49600 |
| Example 10 | 48900 | 10800 | 10100 | 9700 | 10800 | 38800 |
| Comp. Example 1 | 2500 | 9800 | 510 | 490 | 520 | 49600 |

TABLE 2-continued

Concentrations of Impurities in Crude Hydrogen Gas (ppb)

| | Nitrogen | Oxygen | Methane | Carbon monoxide | Carbon dioxide | Moisture |
|---|---|---|---|---|---|---|
| Comp. Example 2 | 2600 | 10500 | 490 | 510 | 480 | 50100 |

TABLE 3

Concentrations of Impurities in Purified Hydrogen Gas (ppb)

| | Nitrogen | Oxygen | Methane | Carbon monoxide | Carbon dioxide | Moisture |
|---|---|---|---|---|---|---|
| Example 1 | 0.1 | <2 | 0.3 | 0.2 | <0.1 | 0.8 |
| Example 2 | 0.1 | <2 | 1.1 | 0.2 | <0.1 | 1.1 |
| Example 3 | 0.5 | <2 | 0.5 | 0.2 | <0.1 | 1.3 |
| Example 4 | 0.1 | <2 | 0.3 | 0.2 | <0.1 | 0.8 |
| Example 5 | 0.6 | <2 | 1.7 | 0.2 | <0.1 | 1.5 |
| Example 6 | 0.3 | <2 | 0.8 | 0.2 | <0.1 | 0.9 |
| Example 7 | 0.1 | <2 | 0.4 | 0.2 | <0.1 | 0.8 |
| Example 8 | 0.2 | <2 | 0.3 | 0.2 | <0.1 | 0.7 |
| Example 9 | 0.1 | <2 | 0.3 | 0.2 | <0.1 | 0.8 |
| Example 10 | 0.1 | <2 | 0.4 | 0.2 | <0.1 | 0.9 |
| Comp. Example 1 | 2400 | <2 | 1300 | <10 | <10 | <50 |
| Comp. Example 2 | | | | | | |

TABLE 4

Designation of Break-through Component and Break-through Time

| | Designation of Break-through Component | Break-through Time (hr) |
|---|---|---|
| Example 1 | Methane | 495 |
| Example 2 | Methane | 420 |
| Example 3 | Nitrogen | 360 |
| Example 4 | Methane | 440 |
| Example 5 | Methane | 400 |
| Example 6 | Methane | 410 |
| Example 7 | Methane | 425 |
| Example 8 | Methane | 835 |
| Example 9 | Methane | 720 |
| Example 10 | Methane | 620 |
| Comp. Example 1 | Nitrogen, Methane | 0 |
| Comp. Example 2 | | |

What is claimed is:

1. A process for purifying hydrogen gas which comprises removing impurities contained in a crude hydrogen gas by bringing said crude hydrogen gas into contact under heating with a zirconium alloy hydride.

2. The process according to claim 1 wherein said zirconium alloy hydride is produced by hydrogenation due to contact of hydrogen gas with a zirconium alloy.

3. The process according to claim 2 wherein said hydrogen gas for the hydrogenation is hydrogen gas diluted by a rare gas to a concentration of 1 to 40% by volume.

4. The process according to claim 3 wherein said rare gas is a gas selected from the group consisting of argon and helium.

5. The process according to claim 2 wherein said hydrogenation due to contact of hydrogen gas with a zirconium alloy is effected in a purifying column for said crude hydrogen gas.

6. The process according to claim 1 wherein said zirconium alloy is a binary alloy consisting essentially of 5 to 50% by weight of vanadium and the balance of zirconium.

7. The process according to claim 1 wherein said zirconium alloy is a multicomponent alloy consisting essentially of 5 to 50% by weight of vanadium, at least one metal selected from the group consisting of nickel, chromium and cobalt in a total amount of 0.5 to 30% by weight and the balance of zirconium.

8. The process according to claim 1 wherein said crude hydrogen gas is brought into contact at a temperature of 400° to 600° C. with said zirconium alloy hydride.

9. The process according to claim 1 where said crude hydrogen gas is brought into contact with said zirconium alloy hydride in a purifying column for said crude hydrogen gas.

10. The process according to claim 9 wherein the material of construction for said purifying column is selected from the group consisting of stainless steel type 316L, stainless steel type 304L, stainless steel type 321, stainless steel type 347 and zircaloy.

11. The process according to claim 1 wherein said crude hydrogen gas is subjected, prior to being brought into contact with said zirconium alloy hydride, to pretreatment by at least one member selected from the group consisting of a nickel catalyst, a copper catalyst, synthetic zeolite, activated carbon, molecular sieving carbon and silica gel, said member being packed in an adsorption column of room temperature system.

* * * * *